United States Patent [19]

Cameron

[11] Patent Number: 4,591,495
[45] Date of Patent: May 27, 1986

[54] METHOD AND APPARATUS FOR MAKING SULPHURIC ACID

[75] Inventor: Gordon M. Cameron, North York, Canada

[73] Assignee: C-I-L Inc., North York, Canada

[21] Appl. No.: 770,673

[22] Filed: Aug. 29, 1985

[51] Int. Cl.⁴ .................. C01B 17/98; C01B 17/74; C01B 17/48
[52] U.S. Cl. ................................. 423/522; 423/533; 423/161
[58] Field of Search ............. 423/522, 533, 535, 529; 422/160, 161

[56] References Cited

U.S. PATENT DOCUMENTS 3,432,264  3/1969  Bostwick et al. ............ 423/533
3,536,446  10/1970  Maurer ........................ 423/522
3,752,884  8/1973  Sasse .......................... 423/522
3,818,088  6/1974  Sasse .......................... 423/522

FOREIGN PATENT DOCUMENTS 2703474  8/1978  Fed. Rep. of Germany ...... 423/522
47-15445  5/1972  Japan ............................ 423/522

Primary Examiner—Gary P. Straub
Attorney, Agent, or Firm—Cushman, Darby & Cushman

[57] ABSTRACT

In a system using the double absorption process for sulphuric acid manufacture, a single acid circulation system and a single cooler are employed. Acid from the exit of the air drying tower and final absorber tower are mixed in a common reservoir, while acid from intermediate absorber tower is discharged to a separate reservoir. Acid from the common reservoir is split between the intermediate and final absorber towers and product line. Acid from the separate reservoir is cooled and split between the drying tower and intermediate absorber tower. The circulation arrangement reduces the cooling to one relatively high temperature location and simplifies acid strength and level control. Only half of the bulk of the circulating acid has to be cooled and the effect of seasonal fluctuating temperatures in the drying tower is minimized.

5 Claims, 1 Drawing Figure

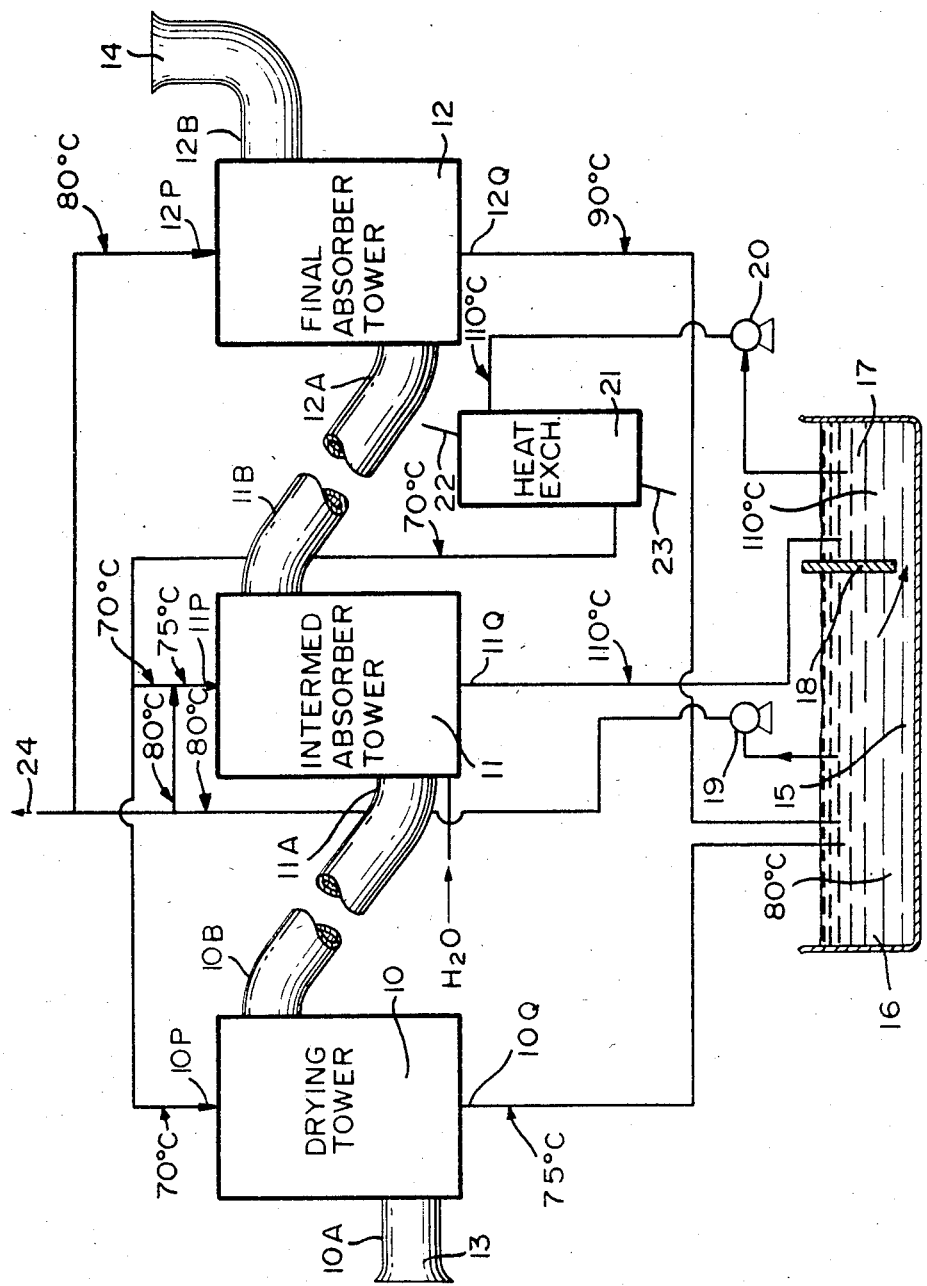

METHOD AND APPARATUS FOR MAKING SULPHURIC ACID

This invention relates to the manufacture of sulphuric acid from sulphur by the double absorption process.

In the double absorption process for sulphuric acid manufacture in which sulphur is used as a feedstock, there are three operations in which the main gas stream is contacted with sulphuric acid and in which significant quantities of heat are evolved and must be removed from the acid. In the classical practice of the art, the system to carry out each such operation consists of a packed tower where gas flows upward through packing and contacts a large recirculating stream of acid into which the appropriate mass and heat are transferred, an acid reservoir with appropriate pumps to recirculate the acid stream, a cooler to remove the heat generated, and the associated acid transfer lines, water dilution lines, and instrumentation to regulate acid strength and inventory.

Drying of incoming air is the first of the three operations. Here, ambient air is contacted by acid to remove moisture. With air, the heat load (i.e. the heat evolved and to be removed) is typically low compared to that evolved in the other operations and is typically about 10% of the total heat load in the three operations. As will be shown later, the acid recirculating in the drying tower typically contains 93-96% $H_2SO_4$ and is normally in the temperature range 40°-70° C.

The second operation is the removal of $SO_3$ from the process gas leaving an intermediate stage of the conversion process. Typically, about 90% of the $SO_3$ formed in the process is removed in this step by contacting with hot 98% $H_2SO_4$ which is typically in the range 70°-110° C. The heat load in this operation is normally around 70% of the total heat load. This operation is normally referred to as intermediate absorption. The acid circulation required is high due to the heat evolution and mass transfer requirements.

The third operation is the removal of $SO_3$ from process gas leaving the last or final stage of the conversion process. Here, the remaining $SO_3$ formed in the process is removed by contact with a third recirculating stream of acid. The heat load is normally small compared to that produced in the intermediate absorption operation, representing at most 20% of the total heat evolution in the acid system.

With three separate systems for carrying out the above three operations, there is a need for acid strength regulation and inventory control in each system. Acid strength regulation is normally achieved by either cross-transfers of acid between systems and/or by water dilution as is appropriate while inventory is normally controlled by regulation of level in each of the systems. Acid circulation in each system is very large compared to the amount of $H_2O$ or $SO_3$ being picked up and is defined by the needs to irrigate the packing in the tower and to stay within appropriate temperature limits which are normally set by a need to avoid serious corrosion.

A traditional sulphuric acid plant is described in U.S. Pat. No. 3,536,446 (Maurer et al), wherein each of the three towers are provided with its own circulation pumps, coolers, pump and reservoirs, and wherein acid strength in each system is regulated by use of cross-flow streams between the tanks, addition of dilution water and product take-off. This approach requires separate coolers, level control means, reservoirs, analyzers, and pumping means and, in consequence, is probably the most expensive and complex acid arrangement in typical practice.

An improved acid system of lesser complexity known as the "mono" system has been developed in which the circulation systems associated with the drying and intermediate absorption operations are combined and acid from a common reservoir or pump tank is pumped through suitable coolers to the drying and intermediate absorption towers. Of necessity, the acid circulating in the drying system now is of 98% strength as this strength is required by the absorption operation and more dilute acid is normally generated by a separate acid dilution system. Three separate systems are still required, however, as the drying system has now been replaced by the dilution system and three levels still require regulation.

Both of the previous approaches discussed above require complex transfer lines, levels, and analyzers to regulate the acid inventory and control acid strength. A multiplicity of acid coolers (i.e. heat exchangers) are also needed to handle the large circulating acid flows. The overall result is an expensive plant which has many potential hazards and is complex to control.

A further improvement to a single circuit and single cooler is shown in Canadian Pat. No. 1,181,568 wherein acid flows via pumping means directly from the drying tower to the final absorber which results in the elimination of the separate final absorbing circuit system. While this system offers a single circulating acid system and single cooling means, it requires, however, two separate reservoirs with level control means and pumping means. Further disadvantages lie in the disparate required pumping means which makes necessary the maintenance of separate spare parts for both pumping means. It further requires piping, valves, level control means for both tanks and large acid through flows in the cooling means to supply the irrigation flow for the very large intermediate absorber and drying towers as well as the acid flow through the drying tower.

One object of this invention is therefore to provide a simpler acid system for a double absorption plant.

A further object of the invention is to provide a system in which heat can be removed from the acid system at one point in the plant where the acid is relatively hot, minimizing the expense in the heat transfer equipment and allowing easier recovery of the associated energy for other uses.

In one of its aspects, the invention provides an apparatus for making sulphuric acid from sulphur, comprising a drying tower, an intermediate absorber tower, and a final absorber tower; each tower having an acid inlet and an acid outlet; wherein the apparatus includes means for feeding acid discharged from said outlets of both said drying tower and said final absorber tower into a common reservoir; means for feeding acid discharged from said outlet of said intermediate absorber tower into a separate reservoir; means for feeding acid from said common reservoir to said inlets of said intermediate absorber tower and said final absorber tower; a heat exchanger; and means for pumping acid from said separate reservoir through said heat exchanger and then into said inlets of both said drying tower and said intermediate absorber tower.

In another of its aspects the invention provides in a double absorption process for manufacturing sulphuric acid, in which a gas stream flows through a drying tower to remove $H_2O$ therefrom and is used to burn sulphur to form $SO_2$ therein, a portion of the $SO_2$ then being converted to $SO_3$, the gas stream then passing through an intermediate absorber tower for removal of said $SO_3$ therefrom, essentially all of the remaining $SO_2$ in said gas stream then being converted to further $SO_3$, said gas stream then passing through a final absorber tower for removal of said further $SO_3$, said gas stream being contacted with sulphuric acid streams in said drying tower and in both said absorber towers, the improvement comprising:

(a) joining the acid streams from said drying tower and said final absorber tower together to form a combined acid stream;

(b) dividing said combined acid stream and flowing a portion thereof to said intermediate absorber tower and said final absorber tower;

(c) cooling the acid stream from said intermediate absorber tower to form a cooled acid stream; and (d) dividing said cooled acid stream and flowing a portion thereof to said drying tower and said intermediate absorber tower.

Further objects and advantages of the invention will appear from the following description of an exemplary embodiment of the invention, with reference to the accompanying drawing which shows a schematic layout of sulphuric acid manufacturing apparatus.

The apparatus shown in the drawing includes three towers, namely, a drying tower 10, an intermediate absorber tower 11, and a final absorber tower 12. Each of these towers has a gas inlet A at the bottom and a gas outlet B at the top. Each tower has an acid inlet P at the top, and an acid outlet Q at the bottom. Each tower is filled with packing through which the gas or air and acid percolate to produce a full and intimate contact therebetween.

The process gas circulation system of the apparatus follows normal practice. Air enters the apparatus through the intake 13, and passes to the drying tower 10 through inlet 10A. The air emerges at the outlet 10B in a moisture-free state. Sulphur is burned with the dry air in a sulphur burner (not shown) to produce sulphur dioxide. The process gas, which is now a mixture of air and sulphur dioxide, then passes through a catalytic converter (not shown) where the majority of the sulphur dioxide is converted into sulphur trioxide. The process gas, laden with $SO_3$ and unconverted $SO_2$, enters the intermediate absorber tower 11 through inlet 11A. The gas exits from outlet 11B, essentially all of the $SO_3$ having passed into the acid. The effluent gas from the intermediate absorber then passes through a second catalytic converter (not shown) where almost all of the $SO_2$ present is converted into $SO_3$. The effluent gas from the second converter then enters the final absorber tower 12, where the last remnants of $SO_3$ are absorbed by the acid circulating in tower 12. The gas finally exhausts to the atmosphere through a stack 14.

The acid outlets 10Q, 11Q, 12Q drain into combined reservoir 15 which is divided into common reservoir 16 and separate reservoir 17 by partial barrier 18 which permits underflow equalization of acid levels between the reservoir. Acid from drying tower 10 and final absorber tower 12 is transferred to common reservoir 16 while acid from intermediate absorber tower 11 is transferred to separate reservoir 17.

A first pump 19 and a second pump 20 convey acid from the respective reservoirs 16, 17. Acid drawn from the separate reservoir 17 is pumped through a heat exchanger 21 (which can physically be one or more heat exchanger units), where it is cooled by cooling water that circulates via conduits 22, 23 through the exchanger. Portions of the acid then travel to the acid inlets 10P, 11P of both the drying tower 10 and the intermediate tower 11. Acid from the drying tower 10 flows to the common reservoir 16. A portion of the acid from the common reservoir 16 is pumped directly to the acid inlet 12P of the final absorber tower and another portion to the acid inlet 11P of the intermediate absorber tower combined with the appropriate portion of cooled acid from separate reservoir 17. Acid product is drawn off through an outlet 24.

The acid draining from the intermediate absorber tower 11 is contaminated with dissolved $SO_2$. Therefore, the acid in the separate reservoir 17 is also contaminated with $SO_2$. Thus, the acid entering the drying tower and the intermediate tower is also contaminated with $SO_2$. In the drying tower, atmospheric air contacts the contaminated acid. Not only does moisture pass from the air to the acid very readily in this tower, but the dissolved $SO_2$ also passes very readily to the dry air stream. Thus, the air in outlet 10B is virtually completely dry, while the acid in outlet 10Q is virtually completely free of $SO_2$. Therefore, the acid in common reservoir 16 is virtually $SO_2$ free, and, therefore, the acid fed to the final absorber tower 12, through inlet 12P, is virtually $SO_2$ free. Thus, there is no stripping of $SO_2$ from the final absorber tower acid into the exhaust gases.

The arrangement of the invention also gives rise to a benefit in the construction of the heat exchanger. In all the towers, the reactions produce heat, and, therefore, the acid emerges from the towers at a higher temperature than it entered the towers. The quantity of heat produced, however, is not the same in each tower. Of the total heat produced in the three towers, the drying tower 10 accounts, typically, for 10%; the intermediate absorber tower 11 for 70%; and the final absorber tower 12 for the remaining 20%. At the same time the requirements for proper contacting between gas and acid in the towers are such that the acid flows through the three towers are roughly in the proportion 1:2:1. A direct consequence of the two sets of data is that there is only a small change in temperature in the acid flowing through the drying tower 10 with a greater temperature rise in the case of the acid flowing through the final absorber 12 and an even larger rise in the case of the acid flowing through the intermediate absorber 11. The temperatures marked on the drawing are typical equilibrium temperatures that arise as a consequence of these exothermic reactions.

The acid in the intermediate absorber tower outlet 11Q is, as would be expected, the hottest, at 110° C. The separate reservoir 17 receives this acid which is pumped to the heat exchanger 21 at a temperature slightly hotter than, 100° C. To keep the acid in the intermediate tower 11 at a temperature at which the reaction is not unduly corrosive, the acid must be cooled to about 70° C. before it enters the intermediate tower. That temperature is well suited also for the acid entering the drying tower 10; and since the heat produced in the drying tower is relatively low, the acid emerges in the outlet 10Q at only slightly warmer than 75° C. At this temperature, the acid does not need to be cooled further prior to its entry into the common reservoir 16. Acid emerging from the final absorber tower is no hotter than 90° C.

Thus, only one heat exchanger 21 need be provided with the arrangement of the invention. The single heat exchanger is also located where the acid is relatively hot. Thus, not only have three heat exchangers in the classic plant been replaced with a single heat exchanger, but also the single heat exchanger is located where the acid is at a relatively high temperature, facilitating heat removal and reducing the cost of the heat transfer system.

The arrangement of the apparatus according to the invention gives rise to the benefit wherein only half of the bulk of the acid in circulation has to be cooled. This is to be contrasted with the process disclosed in Canadian Pat. No. 1,181,568 wherein the process acid heat is removed from a circulating stream enroute to the drying and intermediate absorbing towers, a combined stream amounting in any practical design to the bulk of acid circulating to towers in the plant (three-quarters would be typical). The resultant cooling means must accordingly be very large and, therefore, expensive. While in both processes the quantity of heat to be removed is unchanged and the acid outlet temperature of the heat exchanger is the same, in the process according to the invention higher inlet temperature difference drastically reduces the size and cost of the cooling apparatus.

In addition, the apparatus according to the invention can utilize identical pumping capacity to treat respective acid flows and, thus, provide standardization of pumping means. This results in appreciable cost savings in capital and maintenance.

Yet further, the apparatus according to the invention provides for a steadier operating process whereby the effect of seasonal fluctuating temperatures in the drying tower is minimized.

In the preferred embodiment hereinbefore defined the common reservoir 16 and separate reservoir 17 are connected through equalizing means constituted by the passage under barrier 18. This provides the advantage of having to control only one acid level as opposed to two levels seen in Canadian Pat. No. 1,181,568.

In a less preferred embodiment the two reservoirs may be constituted as two distinct and separate holding tanks.

Not only does the arrangement of the apparatus as called for in the invention give rise to the benefits of a relatively inexpensive, efficient heat exchanger, but also it gives rise to a reduction in the amount of instrumentation needed to control the apparatus. All the acid passes at some stage through common reservoir 16, since the acid circulation system may be regarded as linking the towers "in series". Therefore, just one set of temperature monitoring and control instruments, and one set of acid strength analysing and control instruments, are needed. These are preferably located so as to sample the acid in common reservoir 16, since the acid here responds the earliest to changes in the sulphur strength in the sulphur burner (the most variable of the acid characterizing factors). Any necessary water addition is made to the stream 11Q preferably inside the tower 11.

A useful further benefit of the arrangement of the invention is that because the acid entering the final absorber tower from reservoir 16 has been warmed by its passage through the drying tower or the final absorption tower, the final absorber tower very quickly warms up from cold to its optimum working temperature. This is advantageous from the standpoint of acid quality but also tends to reduce sulphur trioxide contamination of the atmosphere on start-up, which can be a problem when the final absorber tower would otherwise be at low temperatures.

I claim:

1. apparatus for making sulphuric acid from sulphur, comprising a drying tower, an intermediate absorber tower, and a final absorber tower; each tower having an acid inlet and an acid outlet; wherein the apparatus includes means for feeding acid discharged form said outlets of both reservoir;

means for feeding acid discharged from said outlet of said intermediate absorber tower into a separate reservoir;

a heat exchanger;

a first means for pumping acid from said separate reservoir through said heat exchanger and then into said inlets of both said drying tower and said intermediate absorber tower a second pumping means for pumping acid from said common reservoir into said inlets of both said intermediate absorber tower and said final absorber tower, both pumping means being of equal capacity; means for dividing the flow of said acid from said first pumping means into equal streams A and B;

means for dividing the flow of said acid from said second pumping means into equal streams C and D;

means for feeding streams B and D to said intermediate absorber tower; means for feeding stream C to said final absorber tower; means for feeding stream A to said drying tower; and means for connecting said separate reservoir and said common reservoir.

2. Apparatus as claimed in claim 1, wherein substantially all the cooling that the acid that is fed into said inlets of both said drying tower and said intermediate absorber tower undergoes takes place in said heat exchanger.

3. Apparatus as claimed in claim 1 or claim 2 wherein said common reservoir and said separate reservoir are provided with underflow equalization means.

4. In a double absorption process for manufacturing sulphuric acid, in which a gas stream flows through a drying tower to remove $H_2O$ therefrom and is used to burn sulphur to form $SO_2$ therein, a portion of the $SO_2$ then being converted to $SO_3$, the gas stream then passing through an intermediate absorber tower for removal of said $SO_3$ therefrom, essentially all of the remaining $SO_2$ in said gas stream then being converted to further $SO_3$, said gas stream then passing through a final absorber tower for removal of said further $SO_3$, said gas stream being contacted with sulphuric acid streams in said drying tower and in both said absorber towers, the improvement comprising:

(a) joining the acid streams from said drying tower and said final absorber tower together to form a combined acid stream;

(b) dividing said combined acid stream and flowing roughly equal portion thereof to said intermediate absorber tower and said final absorber tower;

(c) cooling the acid stream from said intermediate absorber tower to form a cooled acid stream; and (d) dividing said cooled acid stream and flowing roughly equal portion thereof to said drying tower and said intermediate absorber tower.

5. The process according to claim 4 wherein the acid from said drying tower is substantially not cooled.

* * * * *